(12) United States Patent
Miura et al.

(10) Patent No.: US 6,456,436 B2
(45) Date of Patent: Sep. 24, 2002

(54) OPTICAL DEVICE

(75) Inventors: Michio Miura; Ippei Sawaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 30 days.

(21) Appl. No.: 09/771,907

(22) Filed: Jan. 29, 2001

(30) Foreign Application Priority Data

Feb. 10, 2000 (JP) ......................................... 2000-033571

(51) Int. Cl.$^7$ ........................... G02B 27/10; G02B 6/26; G02F 1/1335; F21V 7/04
(52) U.S. Cl. .................. 359/619; 359/621; 359/623; 359/624; 359/455; 349/61; 349/62; 362/31; 385/43; 385/133; 385/146
(58) Field of Search ................... 359/591, 619, 359/620, 621, 623, 624, 628, 625, 455; 349/10, 61, 62, 65, 112; 362/31, 32, 302, 309; 385/36, 43, 133, 146

(56) References Cited

U.S. PATENT DOCUMENTS

| | | | | |
|---|---|---|---|---|
| 3,782,805 A | * | 1/1974 | Brown | 359/455 |
| 4,305,643 A | * | 12/1981 | Tosswill | 359/623 |
| 4,733,944 A | * | 3/1988 | Fahlen et al. | 359/624 |
| 4,991,933 A | * | 2/1991 | Park | 359/455 |
| 5,592,332 A | * | 1/1997 | Nishio et al. | 359/619 |
| 5,748,828 A | * | 5/1998 | Steiner et al. | 385/146 |
| 5,822,125 A | * | 10/1998 | Meyers | 359/621 |
| 5,973,844 A | * | 10/1999 | Burger | 359/621 |
| 6,049,649 A | * | 4/2000 | Arai | 385/133 |
| 6,075,649 A | * | 6/2000 | Naito | 359/619 |
| 6,124,974 A | * | 9/2000 | Burger | 359/621 |

FOREIGN PATENT DOCUMENTS

| | | |
|---|---|---|
| JP | 63225218 A | 9/1988 |
| JP | 11-109283 | 4/1999 |

* cited by examiner

*Primary Examiner*—Loha Ben
(74) *Attorney, Agent, or Firm*—Greer, Burns & Crain, Ltd.

(57) ABSTRACT

An optical device includes a plurality of lens plates spaced at specific intervals. At least one of the lens plates is provided with a lens array on at least one of its front and rear faces. The lens array is composed of a plurality of closely arranged lenses of a specific configuration. The lens array has at least one groove having a V-shaped cross-sectional configuration at a joint of adjacent lenses in at least one part of the lens array.

12 Claims, 14 Drawing Sheets sectional view in the X direction sectional view in the Y direction the groove deepened the angle of the inclined face of the groove are nearly equal to those of the tip of spacer

OPTICAL DEVICE

CROSS-REFERENCE TO RELATED APPLICATION

This application is related to Japanese Patent Application No. 2000-33571 filed on Feb. 10, 2000, whose priority is claimed under 35 USC § 119, the disclosure of which is incorporated by reference in its entirety.

BACKGROUND OF THE INVENTION

1. Field of the Invention

The present invention relates to an optical device, more particularly, an optical device comprised of lens plates with lens arrays formed on their faces.

2. Description of Related Art

Optical devices comprised of lens plates with lens arrays on their faces have been used in display devices and scanners to form captured images. The lens array is a set of cylindrical lenses arranged adjacently in a certain direction, for example. In the lens array, cross talk of light beams into adjacent lenses is a cause of deterioration in image-forming characteristics because it induces generation of ghosts.

For preventing this cross talk, several means have been developed so far. For example, a light-shielding pattern is formed by applying a light-shielding material to joints between lenses (lens joints) or light-shielding members are provided at lens joints.

FIG. 14 shows a sectional view of a lens plate 101 of a conventional optical device, in which a light-shielding pattern 105 is formed using a black paint to cover lens joints 106 of a cylindrical lens array 104 to prevent the cross talk to adjacent lenses. Out of light beams emitted from a light source 102, those 103 incident on the lenses of the cylindrical lens array 104 pass through the lenses without being blocked, while those incident on the light-shielding pattern 105 are blocked by the light-shielding pattern and do not pass outward (upward in the figure) from the lens plate 101.

FIG. 15 shows a sectional view of another conventional optical device, in which light-shielding members 107 absorbing incident light beams are provided between two lens plates 101 having cylindrical lens arrays 104 on their surfaces to prevent the cross talk to adjacent lenses.

These conventional optical devices cut off only the light beams directly incident on the light-shielding pattern 105 or the light-shielding members 107.

Also, inventions relating to constructions of lens arrays having grooves for preventing the cross talk are disclosed in Japanese Unexamined Patent Publications Nos. SHO 63(1988)-225218 and HEI 11(1999)-109283.

However, to cover the lens joints in the lens array with the light-shielding pattern or members can only cut off the light beams directly incident on the light-shielding pattern or members which are part of the light beams that cause the cross talk in adjacent lenses. In a lens array formed on a relatively thick lens plate with respect to an array pitch of lenses, in particular, light beams passing through the lens plate cause a plenty of cross talk in adjacent lenses. In order to prevent that, it is necessary to increase the width of the light-shielding pattern or members at the lens joints.

An increased width of the light-shielding pattern or members at the lens joints, however, involves a reduction in an effective area of the lenses. Therefore, there is a problem in that these optical devices are dark optical systems with low efficiency in use of light, although they can prevent the occurrence of the cross talk.

In addition, if the light-shielding pattern or members are disposed out of alignment with the lens joints, the cross talk cannot be prevented at all.

SUMMARY OF THE INVENTION

The present invention provides an optical device comprising a plurality of lens plates spaced at specific intervals, at least one of which is provided with a lens array on at least one of its front and rear faces, the lens array being composed of a plurality of closely arranged lenses of a specific configuration, wherein the lens array has at least one groove having a V-shaped cross-sectional configuration at a joint of adjacent lenses in at least one part of the lens array. With this construction, it is possible to reduce the cross talk by light incident from adjacent lenses and maintain good image-forming characteristics.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
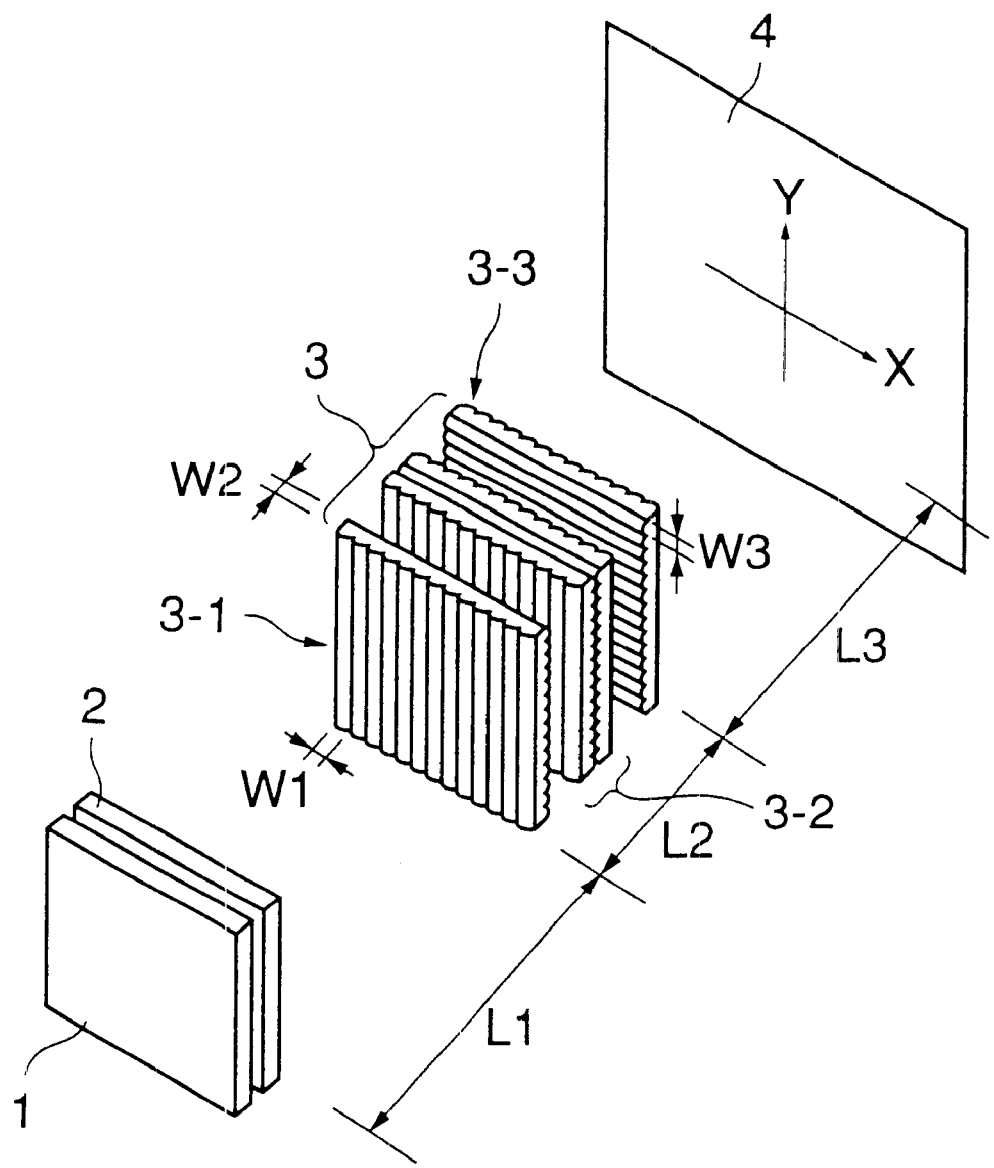
FIG. 1 is a schematic perspective view of an embodiment of a display device using the optical device of the present invention.

An object of the present invention is to provide an optical device capable of preventing the cross talk to adjacent lenses with better effect. The object is attained by forming a groove of a specific configuration at a lens joint in a lens array.

Accordingly, the present invention provides an optical device comprising a plurality of lens plates spaced at specific intervals, at least one of which is provided with a lens array on at least one of its front and rear faces, the lens array being composed of a plurality of closely arranged lenses of a specific configuration, wherein the lens array has at least one groove having a V-shaped cross-sectional configuration at a joint of adjacent lenses in at least one part of the lens array.

Here, the groove is formed to have a surface configuration such that light incident on the groove is refracted or reflected so as not to contribute to image formation.

Further, the groove may have a V-shaped cross-sectional configuration forming two inclined faces having the same angle of inclination. Alternatively, the groove may have a V-shaped cross-sectional configuration forming two inclined faces having different angles of inclination.

Further the groove may be comprised of a single groove or a plurality of grooves arranged adjacently.

The lens array may be an array of a plurality of cylindrical lenses arranged in one direction. Alternatively, it may be an array of lenses of a specific configuration arranged tow-dimensionally.

In addition, the groove may be provided with a light-shielding portion which does not transmit light.

Also the present invention provides an optical device comprising four lens plates spaced at specific intervals; and light-shielding members disposed between the lens plates for maintaining spacings between the lens plates, wherein each of the lens plates has, on its front and rear faces, lens arrays of cylindrical lenses closely arranged in directions orthogonal to each other, and is provided with a groove at a joint of adjacent cylindrical lenses.

Further the present invention provides a display device comprising: a light source; a liquid crystal panel disposed adjacently to the light source; an image-forming screen; and an optical device of the type that includes the previously mentioned lens array that has at least one groove having a V-shaped cross-sectional configuration interposed between the liquid crystal display panel and the image-forming screen, wherein the display device forms an image displayed on the liquid crystal panel onto the image-forming screen through the optical device.

Here, preferably, a support member is provided for maintaining a predetermined spacing between the lens plates. The support member is preferably formed of a light-shielding material for preventing cross talk. The support member is preferably placed in a region that does not contribute to image formation, for example, at a position corresponding to the lens joint or the groove formed at the joint.

The lens plate may be formed, for example, of polycarbonate or an acrylic resin. The support member may be formed of polycarbonate or ABS resin. For prevention of reflection of light, it may preferably be black, and further the surface of the support member is preferably roughened by sandblasting or the like. The support member functions both as a light-shielding member and as a spacer.

The present invention is now described in detail with reference to embodiments as shown in the drawings, which should not be construed to limit the scope of the invention, however.

FIG. 1 shows a schematic perspective view of an embodiment of a display device using the optical device of the present invention. The display device displays erect equal magnification images in projection optics and is composed mainly of a back light source 1, a liquid crystal display (LCD) panel 2, an optical device 3 and a screen 4.

Light from the light source 1 passes through the liquid crystal panel 2 with an image produced thereon, is converged by the optical device 3 comprised of four lens plates 3-1, 3-2, 3—3 and forms the image on the screen 4. This display device is applicable for a so-called LCD multi-panel display. The optical device 3 is a section carrying out the function of forming erect equal magnification images in the projection optics. In order to realize an LCD multi-panel display with less visible joints, a lens or the like for magnifying images (e.g., a Fresnel concave lens) needs to be inserted between an outside lens plate 3—3 and the screen 4 to form magnified images on the screen 4. However, since the insertion of such a lens does not affect the implementation of the present invention, it is omitted. Alternatively, the optical device 3 itself may be a magnifying optical system having the function of magnifying images.

Each of the four lens plates 3-1, 3-2, 3—3 has cylindrical lens arrays orthogonal to each other on its opposite faces. In FIG. 1, the distance L1 between the LCD panel 2 and the optical device 3 is 25 mm, the width L2 of the optical device 3 is 11.92 mm, and the distance L3 between the optical device 3 and the screen 4 is 25 mm. However, these numerical values are not limitative and may vary depending upon designing needs.

Although not shown in FIG. 1, members of a two-dimensionally lattice configuration each functioning as a light-shielding member and also as a spacer between lens plates (referred to as light-shielding spacers hereinafter) are sandwiched between an inside lens plate 3-2 and an outside lens plate 3-1 and between an inside lens plate 3-2 and the outside lens plate 3—3. Thus is built a structure for preventing the cross talk of light beams to adjacent lenses between the lens plates.

The cross talk of light beams into adjacent lenses generates ghost light and deteriorates the qualities of images displayed on the screen significantly. Therefore, to prevent the cross talk is important for realizing a high quality projection optical system. The back light source 1 may be a non-directional light source, but may preferably be a back light having directionality from the viewpoint of efficient use of light. In the case where the optical device is used as a projection optical system for an LCD multi-panel display, it is preferable to use a directional light source.

In the following embodiments, used is a back light source 1 having a directionality of 20° in an X direction and 15° in a Y direction. Light emitted from the light source 1 penetrates through the LCD panel 2, and an image displayed by liquid crystal is projected onto the screen through the optical device 3. Polycarbonate is used as a material for the four lens plates 3-1, 3-2, 3—3.

Figure 2:
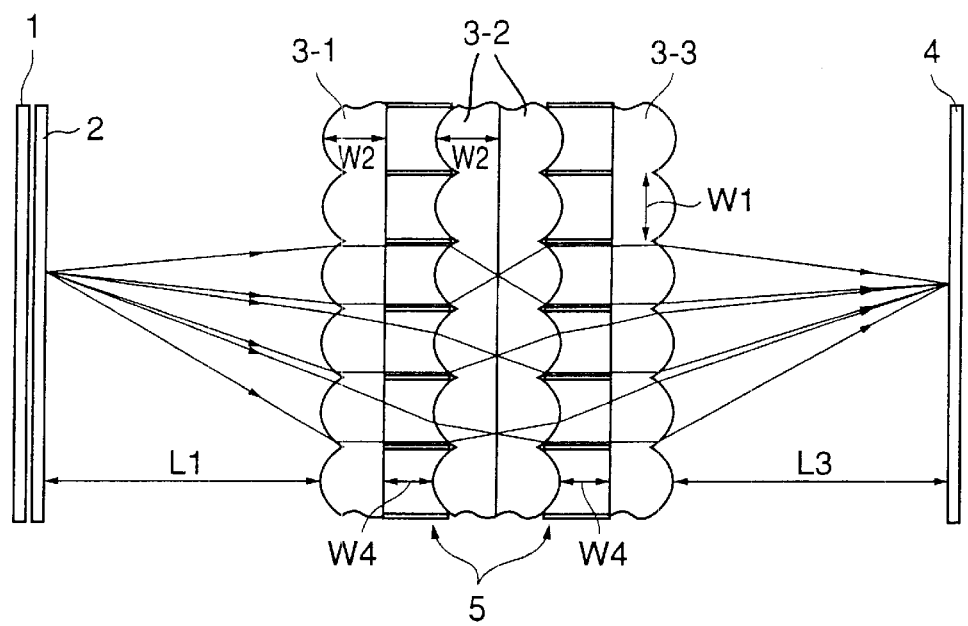
FIGS. 2(a) and 2(b) are sectional views in an X direction and in a Y direction of the optical device of the present invention.
Figure 2:
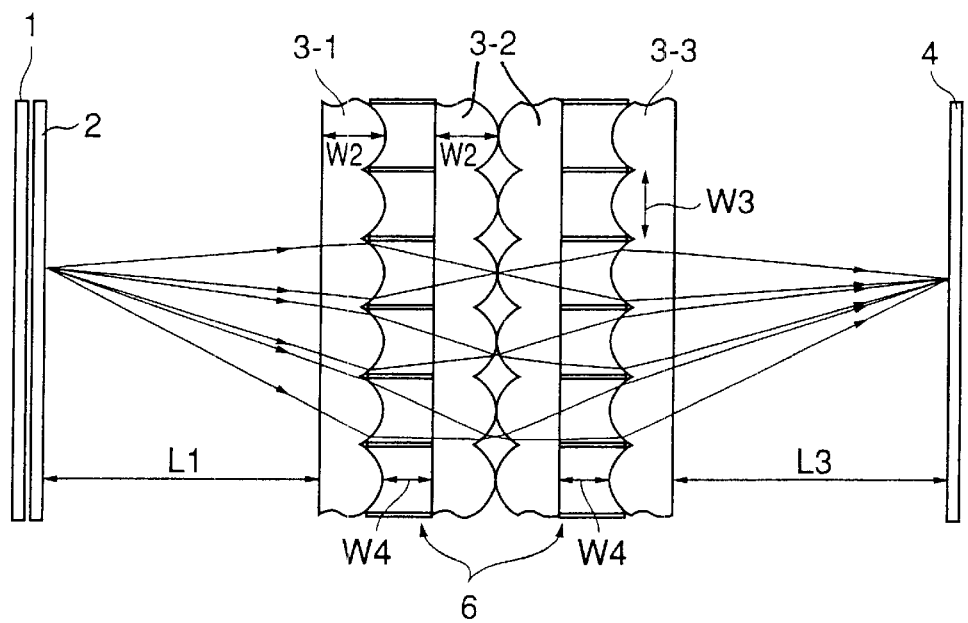
Figure 3:
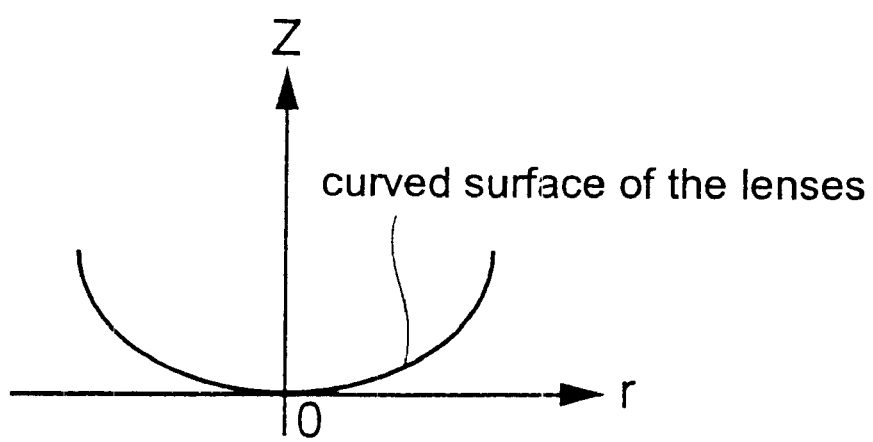
FIG. 3 is a graph representing a general defining formula for a surface configuration of a non-spherical lens.

FIGS. 2(a) and 2(b) are sectional views in the X direction and in the Y direction of the optical device of the present invention. The width W2 of the inside and outside lens plates 3-1, 3-2, 3—3 of the optical device 3 is 1.655 mm, and the distance W4 between the inside lens plates 3-2 and the outside lens plates 3-1, 3—3 is 2.65 mm. Parameters of curved surfaces of the lenses are represented by the following formula and are determined as shown in Table 1. FIG. 3 shows a graph representing a general defining formula of the surface configuration of a non-spherical lens.

$$z = \frac{(cv)r^2}{1 + \sqrt{1-(cc+1)(cv)^2 r^2}} + c_4 r^4 + c_6 r^6$$

TABLE 1

|  | Curvature (cv) | Conic constant (cc) | Coefficient of 4th ($C_4$) | Coefficient of 6th ($C_6$) |
|---|---|---|---|---|
| X-direction inside lens | 0.45875768 | −2.69 | −5.00E-04 | 0 |
| X-direction outside lens | 0.39354585 | −0.6 | −5.20E-04 | −4.20E-05 |
| Y-direction inside lens | 0.45921062 | −0.81 | −1.00E-04 | 0 |
| Y-direction outside lens | 0.51207997 | −2.139 | −1.30E-04 | +6.60E-05 |
| Two-dimensional lens | 0.45638 | −1.48 | 0 | 0 |

Here, Z represents a sag depth of each lens and r represents distance from the middle point of the surface of the lens.

As regards lens pitch of the cylindrical lens array formed on the surfaces of the lens plates, the pitch W1 in the X direction is 2.4 mm and the pitch W3 in the Y direction is 1.6 mm as shown in FIG. 1 and FIGS. 2(a) and 2(b). The light-shielding spacers 5 and 6 in the X direction and in the Y direction, respectively, are 0.5 mm thick. The lens plates 3 are each formed of a polycarbonate plate as a material by pressing with heat. The light-shielding spacers are formed of ABS resin as a material by injection molding.

As shown in FIGS. 2(a) and 2(b), light coming out of a certain point on the back light source 1 passes through the LCD panel 2 with the directionality of 20° in the X direction and 15° in the Y direction, and becomes incident on a plurality of lenses of the optical device 3. As shown in the figures, the incident light is refracted, and passes through the four lens plates 3-1, 3-2, 3—3 sequentially. The light is then converged upon an image-formation point on the screen 4. In the case of a light beam having the above-described directionality, the light beam becomes incident on and passes through five lenses in the X direction and seven lenses in the Y direction in the optical device of this embodiment, and forms an image on the screen 4.

The overall construction and function of the display device using the optical device of the present invention has been explained above. However, the present invention is characteristic in that grooves of a specific configuration are provided at lens joints in lens arrays in the optical device shown in FIG. 1 and FIGS. 2(a) and 2(b).

In FIG. 1, out of the cylindrical lens arrays formed on the opposite faces of the outside lens plate 3-1, the one formed on the face closer to the LCD panel is referred to as an "X-direction outside lens array," and the one formed on the face closer to the inside lens plates 3-2 is referred to as a "Y-direction outside lens array." The lenses of the X-direction outside lens array are arranged in the direction of an X-axis in FIG. 1.

As to the outside lens plate 3—3, the cylindrical lens array closer to the screen 4 is an "X-direction outside lens array," and the cylindrical lens array nearer to the inside lens plates 3-2 is a "Y-direction outside lens array."

In the two inside lens plates 3-2 which are disposed in close contact, the cylindrical lens arrays formed on contact faces are referred to as "Y-direction inside lens arrays," and the cylindrical lens arrays formed on the faces that do not contact each other but oppose the outside lens arrays 3-1 and 3—3 are referred to as "X-direction inside lens arrays".

Accordingly, the Y-direction outside lens arrays and the X-direction inside lens arrays contact the light-shielding spacers 5 and 6.

First, explanation is given of a construction in which V grooves are formed at lens joints in the "X-direction outside lens arrays" and "Y-direction inside lens arrays." Light beams, which would cause the cross talk in adjacent lenses in the absence of such grooves as in currently available devices, are reflected totally and internally or refracted by inclined faces of the grooves so that cross-talk light is cut off. Parameters (the depth and width of the grooves, the angle of the inclined faces of the grooves) shown in the following embodiments should not be understood to be limitative. For they are to be determined depending upon various designing needs of optical devices such as refractive indices of lens plates, wavelength of light sources, required degree of suppression of cross talk and the like, and accordingly the parameters are not established uniquely.

Figure 4:
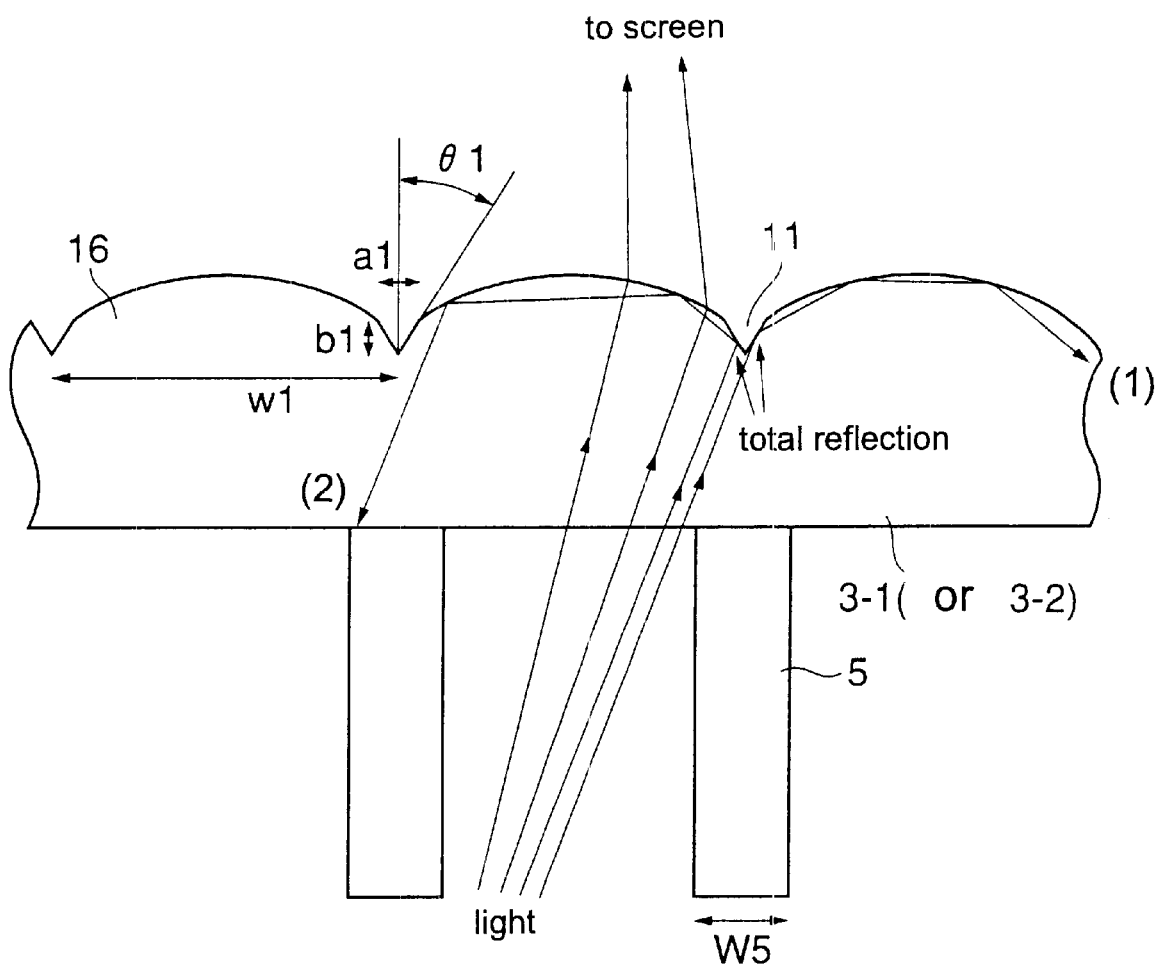
FIG. 4 is an enlarged view of an X-direction outside lens array of the optical device of the present invention.

FIG. 4 is an enlarged view of an X-direction outside lens array 16 of the optical device of the present invention. Light beams (1) and (2) shown in the figure are totally and internally reflected by inclined faces of a V groove 11 formed at a lens joint and therefore do not form cross-talk light to adjacent lenses. In this embodiment, in order that the light beams incident on the V grooves 11 are totally and internally reflected by the inclined faces of the grooves, the width a1, depth b1 and inclination angle θ1 of the V grooves are set 0.1 mm, 0.08 mm and 32°, respectively. The V grooves 11 are each formed of two inclined faces, whose inclination angles are equal. The thickness W5 of the X-direction light-shielding spacers 5 is 0.5 mm.

Where the display device of FIG. 1 was constructed with use of lens plates with these grooves, the intensity of the cross-talk light in adjacent lens was suppressed to as low as 0.005% of a main peak intensity of light incident on the screen.

Also the formation of the V grooves 11 increased tolerance in positioning the X-direction light-shielding spacers 5 and the X-direction outside lens array 16 in the X direction to ±0.1 mm, which was significantly larger than the tolerance (±0.025 mm) in the absence of the grooves. Here the tolerance means a range which satisfies the intensity of the cross-talk light not exceeding 0.1% of the main peak intensity.

In the case where the grooves are not formed, the width of the X-direction light-shielding spacers 5 is required to be increased to at least 0.6 mm for preventing the cross-talk light and achieving a tolerance in positioning of ±0.1 mm. In that case, the X-direction light-shielding spacers 5 cut off not only the cross-talk light but a plenty of light beams that contribute to image formation. Consequently, the main peak intensity decreases to 87% of that of the case where the grooves of FIG. 4 are formed. Such an optical device is a dark optical system with poor efficiency in use of light.

In other words, if the tolerance in positioning is the same, i.e., ±0.1 mm, the present invention can realizes a brighter optical device by forming the grooves as shown in FIG. 4. Also, compared with an optical device having light-shielding members of 0.5 mm width as in FIG. 4 but not having the grooves, the main peak intensity decreases only by 0.5% with the optical device having the grooves, which shows that the formation of the grooves hardly affects the optical system adversely.

In the optical device shown in FIG. 4, since the direction of the light beams incident on the V grooves 11 is limited within a certain range, the angle θ1 of the grooves is limited to some extent from conditions for attaining the total internal reflection of the light beams. However, the size of the grooves (depth, width) can be set so that the optical device has necessary characteristics.

The intensity of the cross-talk light, tolerance in positioning and decrease in the main peak intensity can be changed by varying the size of the grooves, though they may be affected by the thickness of the lens plates, the thickness of the X-direction light-shielding spacers 5 and the like.

For example, if the above-described V grooves 11 in the X-direction outside lens array 16 are similarly reduced in size to 70% by reducing the width a1 and depth b1 of the grooves to 0.07 mm and 0.056 mm, respectively, the intensity of the cross-talk light to adjacent lenses rises to 0.038% of the main peak intensity in the designed arrangement. Accordingly, for satisfying the intensity of the cross-talk light not exceeding 0.1% of the main peak intensity, the tolerance in positioning the light-shielding members and X-direction outside lens array 16 is decreased to ±0.05 mm, but the main peak intensity decreases only by 0.2%. If this intensity of the cross-talk light and this tolerance in positioning are satisfactory for a desired optical device, the grooves of this size are considered to be desirable since the decrease in the main peak intensity can be suppressed.

In contrast, if the size of the grooves is doubled similarly by increasing the width a1 and depth b1 of the grooves to 0.2 mm and 0.16 mm, respectively, the intensity of the cross-talk light to adjacent lenses is very low, 0.0001% or lower of the main peak intensity in the designed arrangement. Accordingly, the tolerance in positioning the light-shielding members 5 and X-direction outside lens array 16 that satisfies the intensity of the cross-talk light not exceeding 0.1% of the main peak intensity increases to ±0.25 mm. However, the decrease in the main peak intensity rises to 2.2%. Thus, if the decrease in the main peak intensity is to be accepted, if the intensity of the cross-talk light is to be decreased or if the tolerance in positioning is to be raised, the size of the grooves needs to be increased as described above.

To sum up, it is important to set the size of the grooves such that the required characteristics of an optical device are satisfied. The embodiment of FIG. 4 shows the result of designing in accordance with the following required specifications: The intensity of the cross-talk light is 0.1% or less of the main peak intensity, the tolerance in positioning the light-shielding members 5 and the X-direction outside lens array 16 is ±0.1 mm or more, and the main peak is affected as little as possible.

Figure 5:
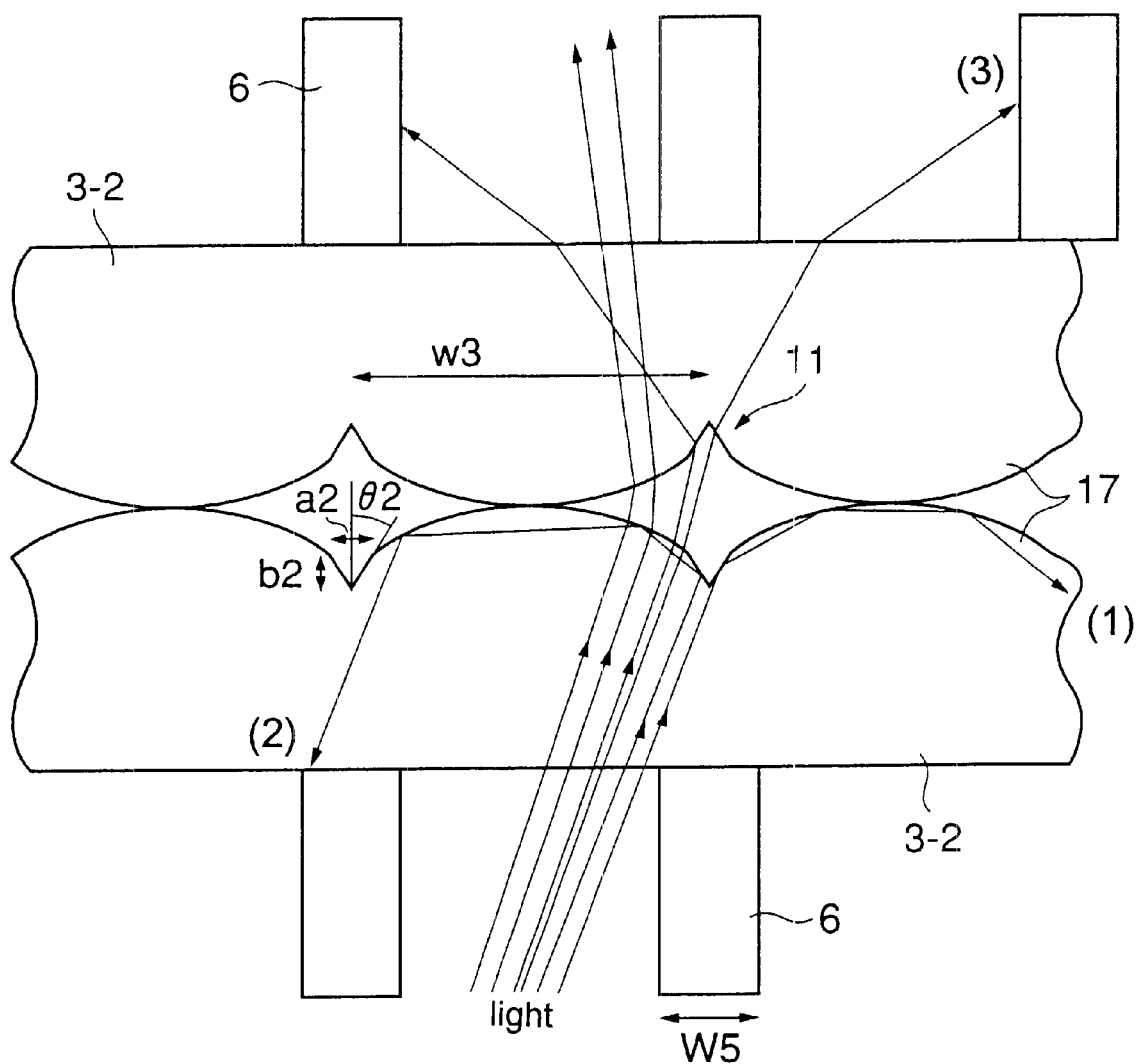
FIG. 5 is an enlarged view of Y-direction inside lens arrays of the optical device of the present invention.

Next, FIG. 5 shows an enlarged view of the Y-direction inside lens arrays of the optical device of the present invention. Here, for preventing the cross talk, grooves with a width a2 of 0.1 mm, a depth of b2 of 0.06 mm and an angle θ2 of 39.8° as shown in the figure are formed at lens joints so that light beams incident on the grooves are totally and internally reflected (see light beams (1) and (2)). The cross-talk light is also prevented by refraction by faces of the grooves (see light beam (3)). Consequently, the intensity of the cross-talk light into adjacent lenses was reduced to 0.02% of the main peak intensity. Further, as regards the tolerance in positioning the Y-direction inside lens arrays 17 that satisfies the intensity of the cross talk light not exceeding 0.1% of the main peak intensity, ±0.05 mm was ensured.

Figure 6:
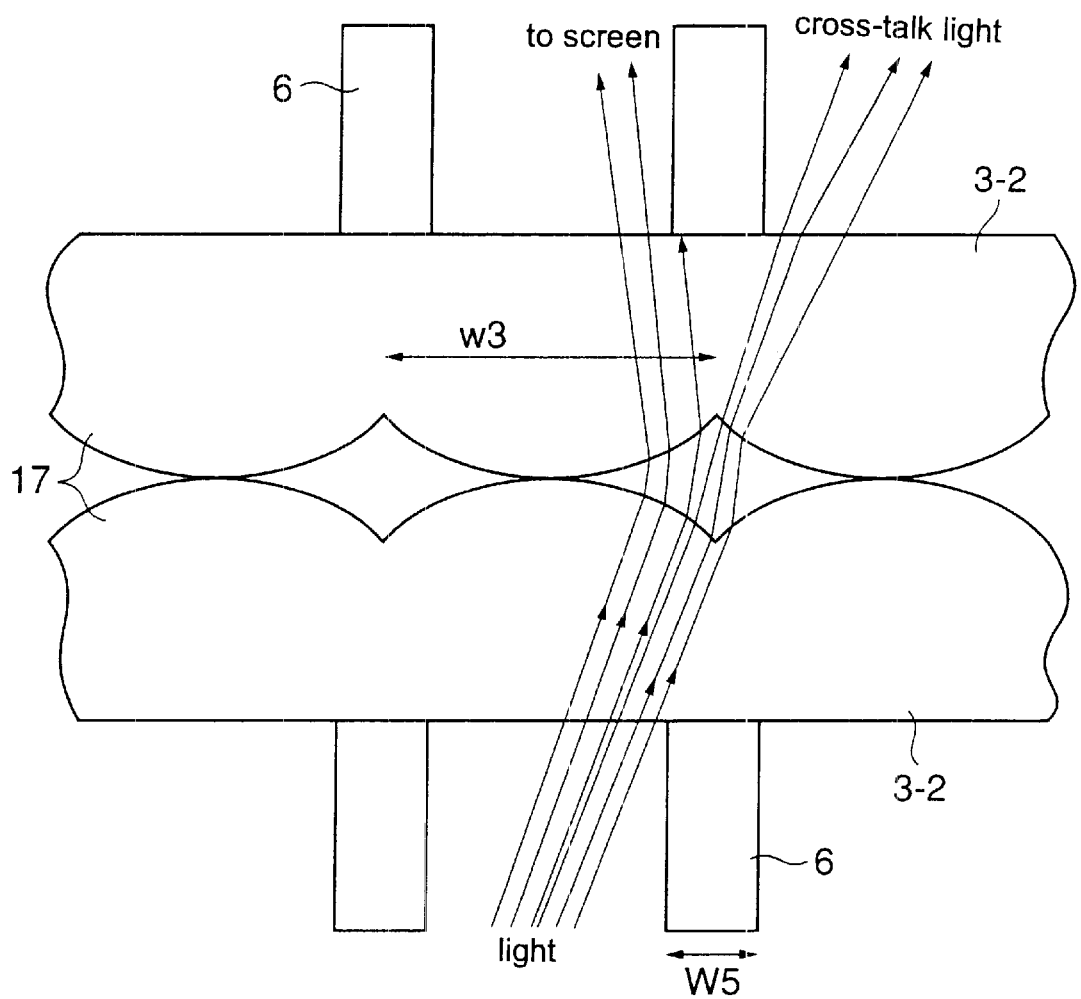
FIG. 6 is an enlarged view of a part of the optical device of the present invention in the case where grooves are not formed in joints in the Y-direction inside lens arrays.

FIG. 6 shows an enlarged view of a part of an optical device whose Y-direction inside lens arrays 17 are not provided with grooves at their lens joints. As shown in FIG. 6, in the absence of the grooves, a plenty of cross-talk light is generated, which impairs the image forming characteristics significantly.

Figure 7:
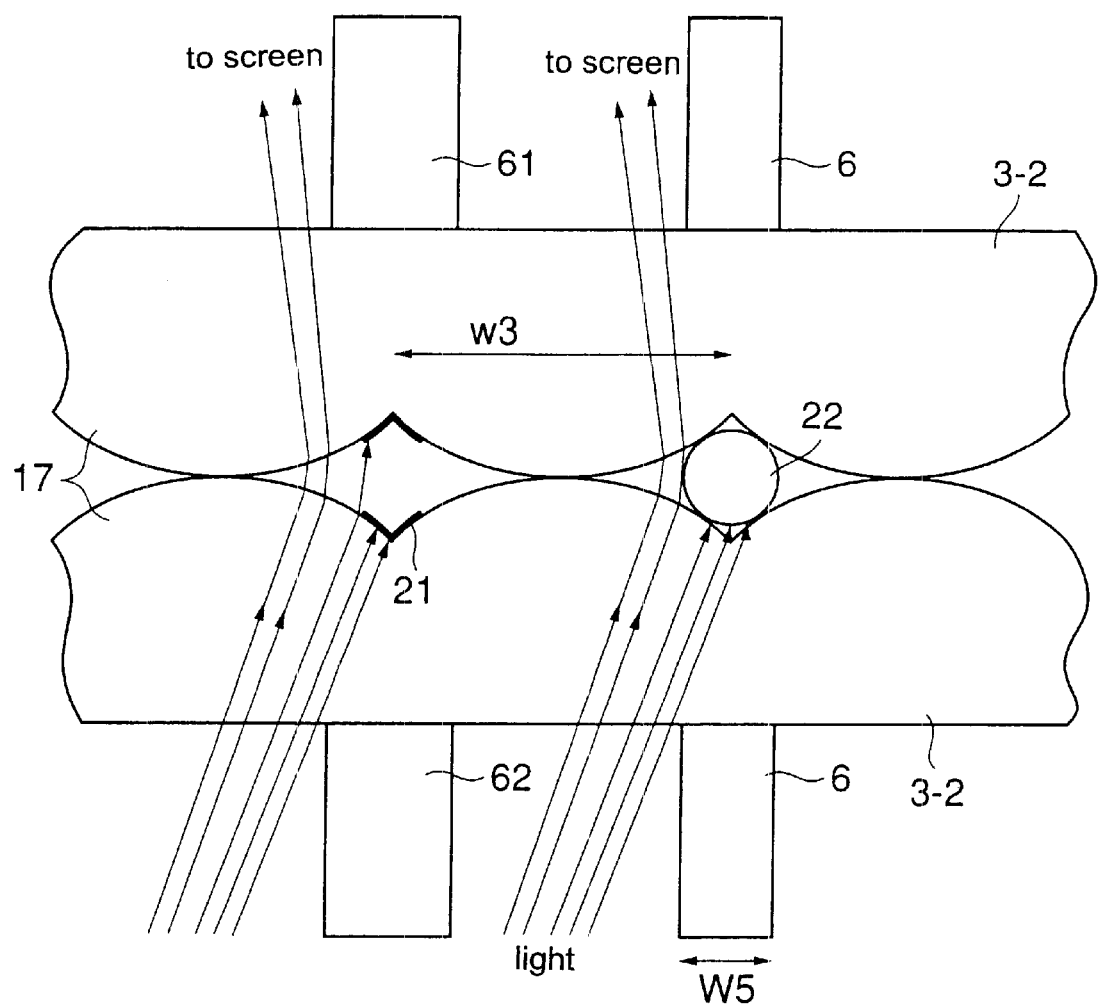
FIG. 7 illustrates a currently practiced means against cross talk.

FIG. 7 shows an explanatory view of an example of a currently practiced means against the cross talk.

As shown in FIG. 6, in the case where the grooves are not formed, a plenty of cross-talk light is generated, which impairs the image forming characteristics significantly. To prevent that, are currently conducted measures such as forming a light-shielding pattern 21 at lens joints as shown in FIG. 7, sandwiching light-shielding members 22 between lens plates, thickening Y-direction light-shielding members 61 and 62 and the like. However, the formation of the grooves as shown in FIG. 5 saves the need for the light-shielding pattern and light-shielding members and consequently leads to reduction in the number of components of the optical system and decrease in the number of production steps.

The intensity of the cross-talk light and the tolerance in positioning the Y-direction inside lens arrays can also be changed by varying the size of the grooves like the X-direction outside lens array. For example, if the width a2 and depth b2 of the grooves are 0.15 mm and 0.09 mm, respectively, the intensity of the cross-talk light into adjacent lenses is reduced to 0.006% of the main peak intensity, and the tolerance in positioning the Y-direction inside lens arrays that satisfies the intensity of the cross-talk light not exceeding 0.1% of the main peak intensity is increased to ±0.15 mm. However, the main peak intensity decreases about 3% as compared with the case of FIG. 5.

In the embodiment of FIG. 5, the parameters are determined for meeting, as a required specification, ±0.05 mm or more of tolerance in positioning the Y-direction inside lens arrays that satisfies the intensity of the cross-talk light not exceeding 0.1% of the main peak intensity.

Next, explanation is given of an embodiment in which grooves are provided at lens joints in the X-direction inside lens array.

Figure 8:
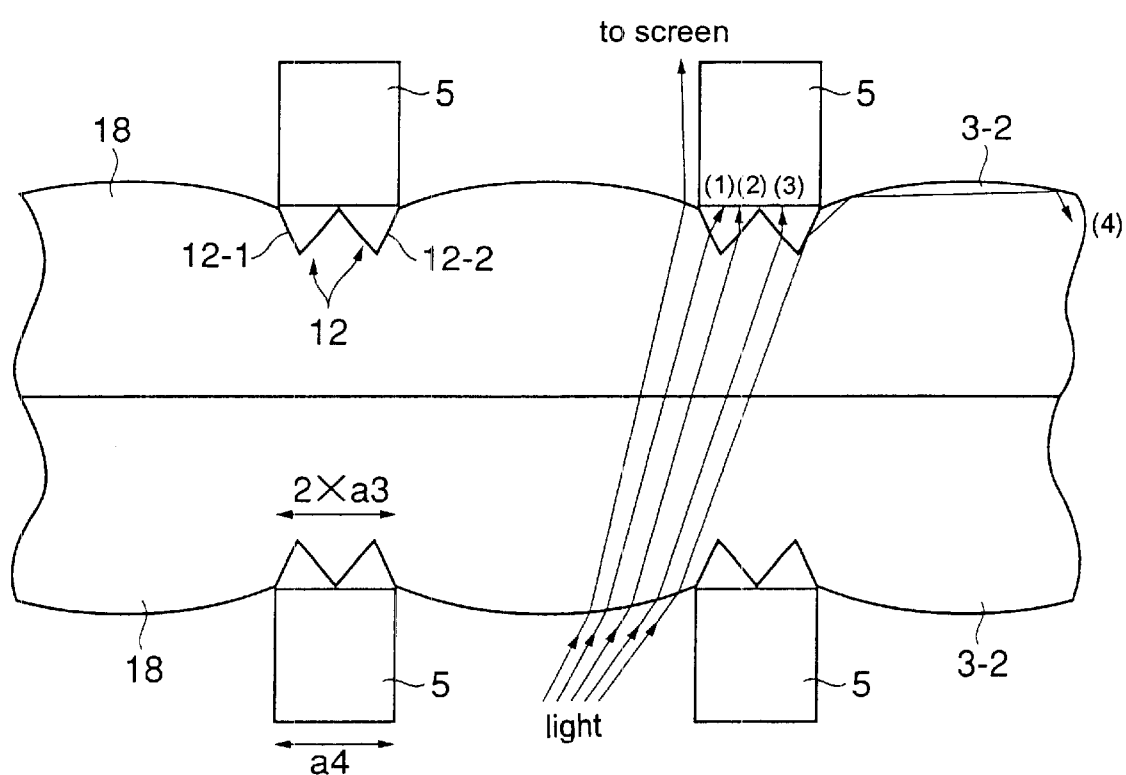
FIG. 8 is an enlarged view of X-direction inside lens arrays of the optical device of the present invention.
Figure 9:
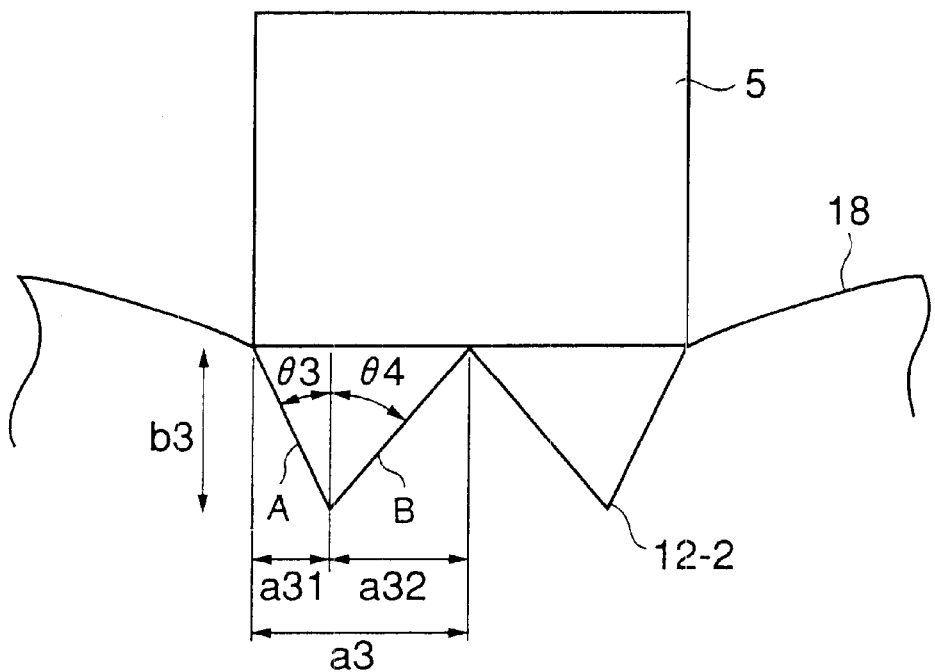
FIG. 9 is an enlarged view of the grooves of FIG. 8.

FIG. 8 shows an enlarged view of the X-direction inside lens arrays 18 in contact with the X-direction light-shielding spacers 5 of the optical device of the present invention. FIG. 9 shows an enlarged view of a groove portion of FIG. 8.

In FIG. 8, a V groove portion 12 forms two grooves 12-1 and 12-2 of asymmetric configuration whose width a3 and depth b3 are 0.2 mm and 0.1 mm, respectively. The V groove portions 12 prevent the cross talk to adjacent lenses by reflecting totally and internally or refracting light which would otherwise be cross-talk light (see light beams (1), (2), (3) and (4)). Here, inclined faces A and B of one groove of the V groove portion have different inclination angles.

The angle θ3, 21.8°, of the inclined faces A of the grooves 12-1 and 12-2 is determined so that light beams incident on these faces are totally and internally reflected, whereas the angle θ4, 58°, of the inclined faces B is determined so that light beams incident on these faces are refracted toward the light-shielding spacers. The width a4 of the X-direction light-shielding spacers 5 is set to 0.4 mm in agreement with the widths of the two grooves.

The formation of the V groove portions 12 consequently reduces the intensity of the cross-talk light to adjacent lenses to 0.0005% or less of the main peak. The tolerance in positioning the X-direction inside lens arrays that satisfies the intensity of the cross-talk light not exceeding 0.1% is decreased to ±0.075 mm, though it is almost 0 in the absence of the grooves.

Where the grooves are not formed, it is necessary to increase the width of the light-shielding spacers 5 disposed in contact with the lenses to 0.7 mm for preventing the cross-talk to adjacent lenses and for ensuring the tolerance in positioning. If the light-shielding spacers 5 are widened, not only the cross-talk light but also light beams which contribute to the image formation of the main peak is cut off by the light-shielding spacers 5, as discussed about the X-direction outside lens array of FIG. 4. Therefore, the optical device becomes an optical system about 17% darker than the optical device with the grooves.

The formation of the V groove portions 12 also provides an advantage, i.e., an increased tolerance in positioning the X-direction inside lens arrays 18 and the light-shielding spacers 5. That is because the cross talk to adjacent lenses does not take place even if the V groove portions 12 are not completely covered with the light-shielding spacers 5. Obtained is a tolerance of ±0.1 mm, which is ±0.05 mm greater than the tolerance in the absence of the grooves.

By taking this advantage, that is, the cross talk to adjacent lenses does not occur even if the V groove portions 12 are not completely covered with the X-direction light-shielding spacers 5, it is possible to reduce the width of the light-shielding spacers 5 as compared with the width of the groove portions 12.

Figure 10A:
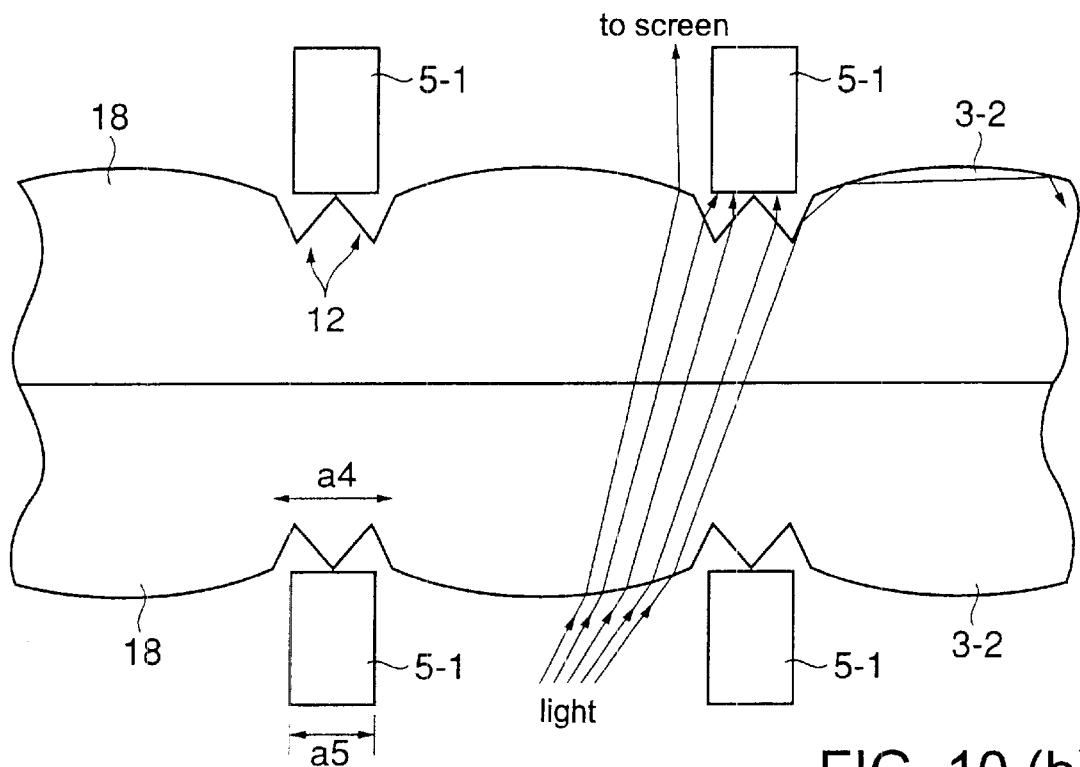
FIGS. 10(a) and (b) are enlarged views of the X-direction inside lens arrays of the optical device of the present invention.

FIG. 10(a) shows an enlarged view of an embodiment of X-direction inside lens arrays of the optical device of the present invention in which the width a5 of the X-direction light-shielding spacers 5-1 is smaller than the width a4 (a4=0.4 mm) of the V groove portions 12.

Figure 10B:
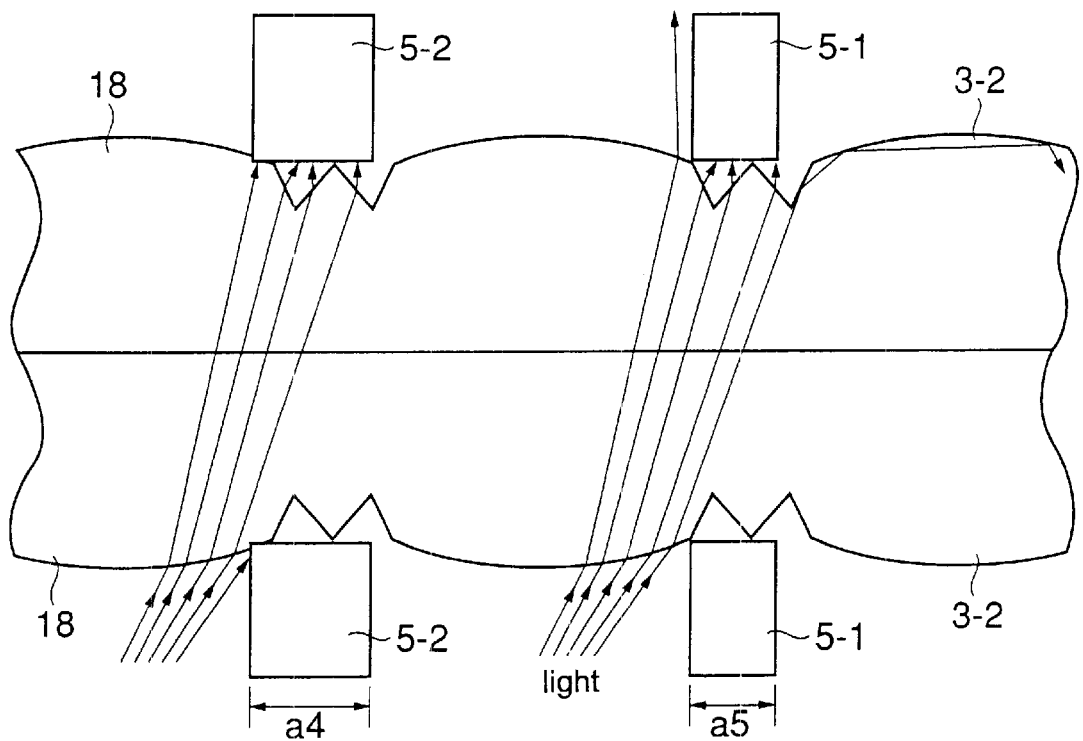

FIG. 10(b) shows a construction similar to FIG. 10(a), but the X-direction light-shielding spacers 5 are out of alignment with the X-direction inside lens arrays 18. Here, wider X-direction light-shielding spacers 5-2 on the left cut off light beams contributing to the image formation of the main peak, while narrower X-direction light-shielding spacers 5-1 (whose width a5 is 0.3 mm) on the right do not cut off the light beams contributing to the image formation of the main peak even if the X-direction inside lens arrays 18 and the light-shielding spacers 5-1 are out of alignment. Thus the quality of formed image is maintained.

In the X-direction inside lens arrays shown in FIG. 8, FIG. 9 and FIG. 10(a) which are in contact with the light-shielding spacers 5, it is possible to prevent the cross talk to adjacent lenses by forming single grooves as the V grooves 11 in the X-direction outside lens arrays and Y-direction outside lens arrays. However, by utilizing the structure in which the light-shielding spacers 5 are close to the groove portions 12, the double grooves can prevent the cross talk light not only by the total internal reflection but by refracting light at the faces of the grooves and directing it to the light-shielding spacer 5 as light beams (1) to (3) in FIG. 8.

In other words, in the lens arrays shown in FIG. 8 and FIG. 9, the groove is divided into two. An advantage of this division of the groove is that it is possible to reduce the depth of each groove as compared with the single groove. If the grooves are shallower, unevenness of a lens face can be suppressed. That can improve accuracy in transferring the shape of a mold when lens plates are manufactured by heat pressing method and injection molding, which are effective techniques for mass production of lens plates. Consequently, highly accurate lens faces and grooves are realized.

In the case where elements of the optical system such as the V groove portions 12 and light-shielding spacers 5 are closely placed as in the embodiment shown in FIG. 8, the accuracy in positioning the elements can be improved by suitably designing their shapes.

Figure 11A:
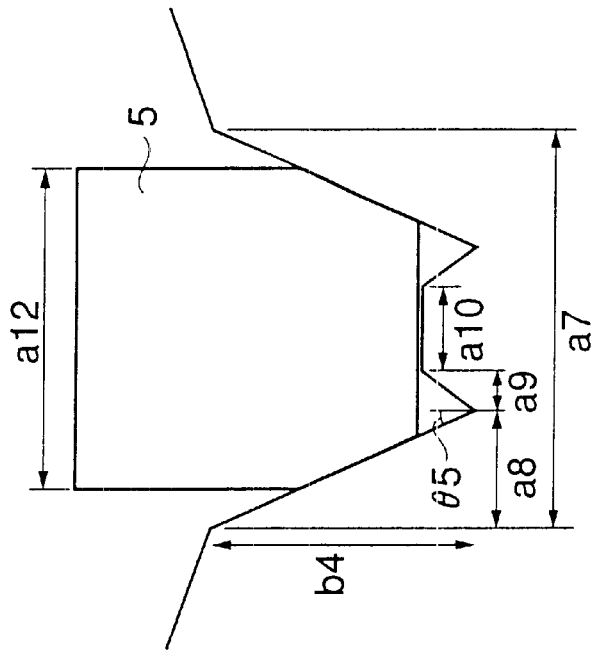
FIGS. 11(a) and 11(b) are enlarged views of a connection of a light-shielding spacer with a lens plate in accordance with the present invention.
Figure 11:
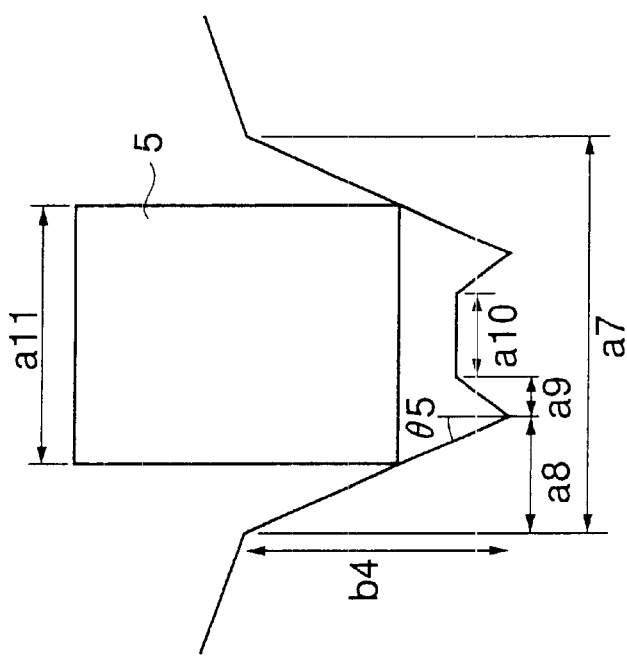

FIGS. 11(a) and 11(b) are enlarged views of a connection of the light-shielding spacer 5 with the lens plate 3-1 according to the present invention. In FIG. 11(a), the groove is deepened as compared with FIG. 8 and the tip of the light-shielding spacer 5 is lengthened, so that they are fitted. In FIG. 11(b), the angles of the inclined faces of the groove are equal to those of the tip of the light-shielding spacer 5 so that their fitting accuracy is improved. In FIGS. 11(a) and 11(b), examples of parameters are: a7=0.4 mm, a8=0.072 mm, a9=0.02 mm, a10=0.216 mm, b4=0.18 mm, a11=0.32 mm, a12=0.37 mm, and θ5=21.8°.

In assembling optical systems, the positioning of the lenses and the light-shielding spacers has been required to be exactly adjusted with checking an image forming state one by one so far. However, the adoption of a fitting structure shown in FIG. 11(a) or 11(b) enables an automatic positioning with an accuracy of ±10 μm without exact adjustment. This leads to a great reduction in production costs.

By providing the fitting structure at a larger number of sites, accuracy in positioning can be improved. However, the fitting structure does not need to be adopted at all the grooves. For example, if the unevenness of the surface of the lens plate is desired to be suppressed as much as possible for improving the accuracy of lens faces and groove faces, the grooves and the light-shielding spacers as shown in FIGS. 11(a) or 11(b) may be formed in a central region of the lens plate so that only the grooves there have the fitting structure. In other regions than the central region, may be formed the grooves and light-shielding spacers as shown in FIG. 8 or FIG. 10(a).

As discussed above, in image-forming optical systems for LCD multi-panel displays, the conventional optical systems having no grooves at lens joints provide almost no tolerance in positioning their components and need light-shielding members on Y-direction inside lens arrays for preventing the cross talk. However, if the grooves are formed at the lens joints as shown in the embodiments of the present invention, a tolerance of ±0.05 mm or more is ensured in positioning components; light-shielding members are not required between the Y direction inside lens arrays; and an assembly process is greatly simplified by adopting the fitting structure between the light-shielding spacers and the lens plate. Thus, it is possible to realize both improvement in optical characteristics and reduction in the production costs.

As regards the parameters such as the shape and size of the grooves and the like indicated in the above-described embodiments, it is necessary to select an appropriate shape and size for the grooves and the light-shielding spacers depending upon the thickness of the lenses, a material for the lens plates, desired optical characteristics and the like even if the optical device is of the same type as that of the image-forming optical device for LCD multi-panel displays in the embodiments. Additionally, the V groove portions 11 and 12 do not always need to have planar slopes, but may have curved slopes so long as light beams incident on the slopes of the grooves are totally and internally reflected or refracted properly.

Next, shown is an embodiment of an optical device in which a two-dimensional lens array is formed. The two-dimensional lens array means, for example, two-dimensionally arrayed hemi-spherical square lenses. The lenses are each surrounded by V groove portions 13. Here, the thickness b20 of the square lenses is 0.5 mm, for example.

Figure 12:
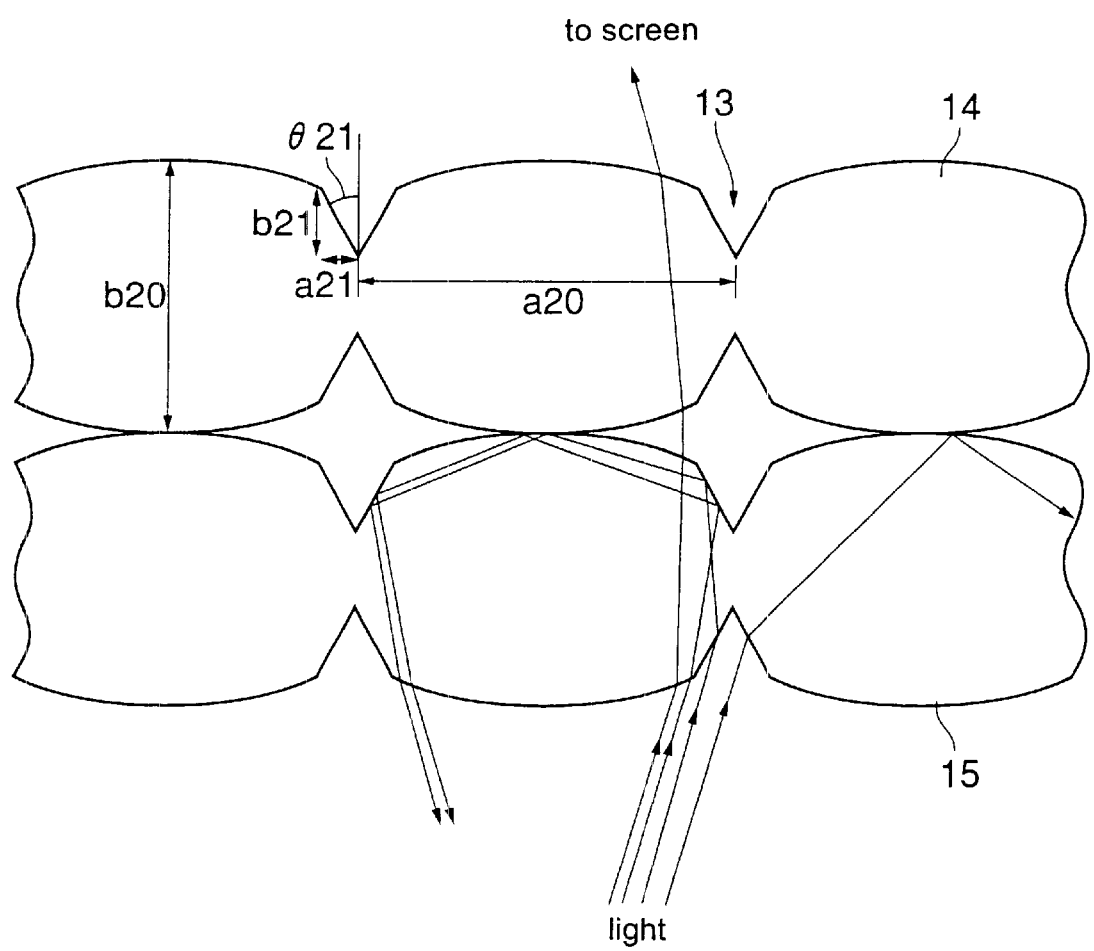
FIG. 12 is a sectional view of an optical device composed of two-dimensional lens plates in accordance with the present invention.

FIG. 12 shows a sectional view of an optical device composed of two two-dimensional lens plates. An acrylic resin is used as a material for lenses. The parameters of the lenses are those shown in Table 1.

The lens pitch a20 is 1.0 mm in both the X and Y directions. The width 2×a21, depth b21 and angle θ21 of groove portions 13 are 0.15 mm, 0.16 mm and 25.1°, respectively. The groove portions 13 prevents the cross talk to adjacent lenses as in the above-described embodiments. In this embodiment, the intensity of the cross talk was reduced to 0.001% or less of the main peak. Here, used was a light source having a directionality of 10° in the X direction and 10° in the Y direction.

This reduction of the cross talk eliminates the need for a light-shielding pattern at the lens joints which has been necessary so far. Further, as regards the accuracy in positioning front and rear lenses in the production of the lens plates, it has been required to be within ±20 μm. However, in the embodiment of FIG. 12, a tolerance of ±50 μm can be ensured, which is double or more of the currently available tolerance. That is, the embodiment can improve a production yield and can reduce the costs of the lens plates.

Figure 13:
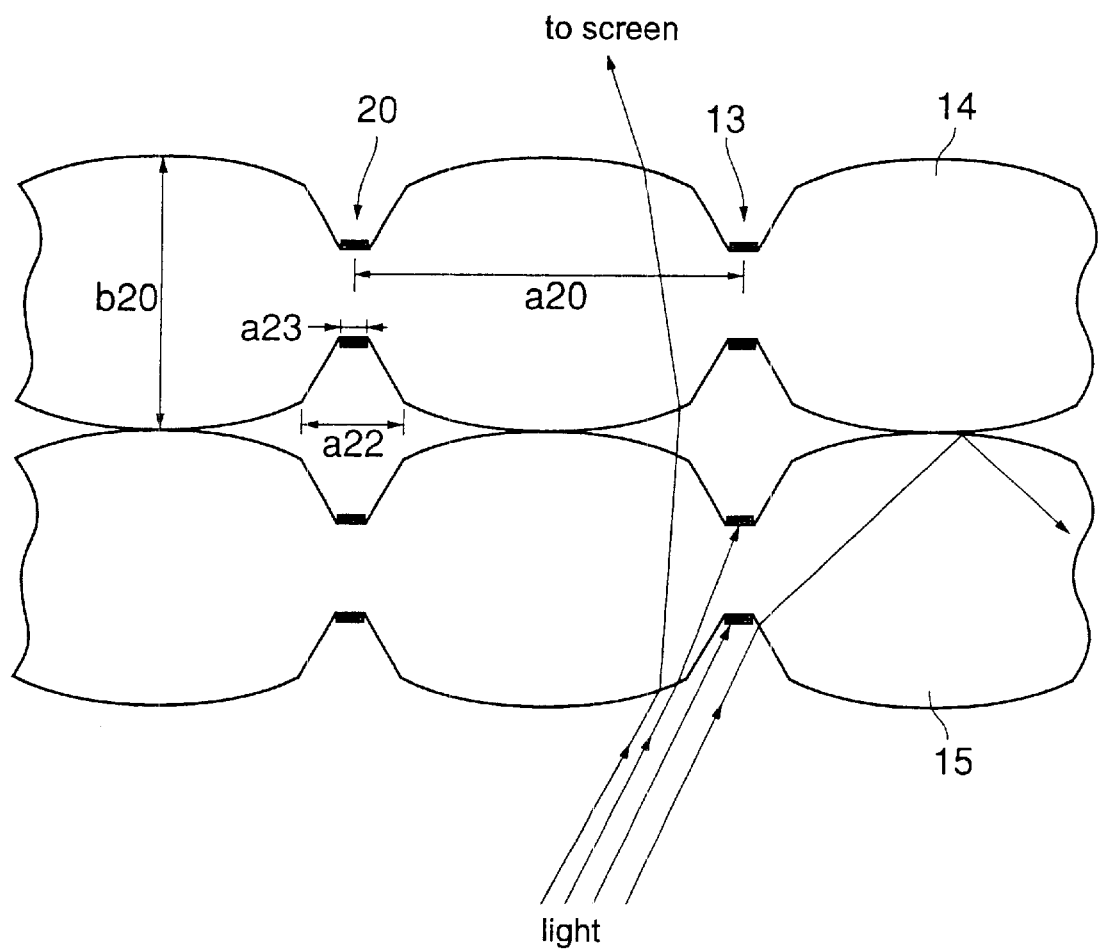
FIG. 13 illustrates an embodiment of an optical device in accordance with the present invention which has wide grooves where light-shielding portions are formed.
Figure 14:
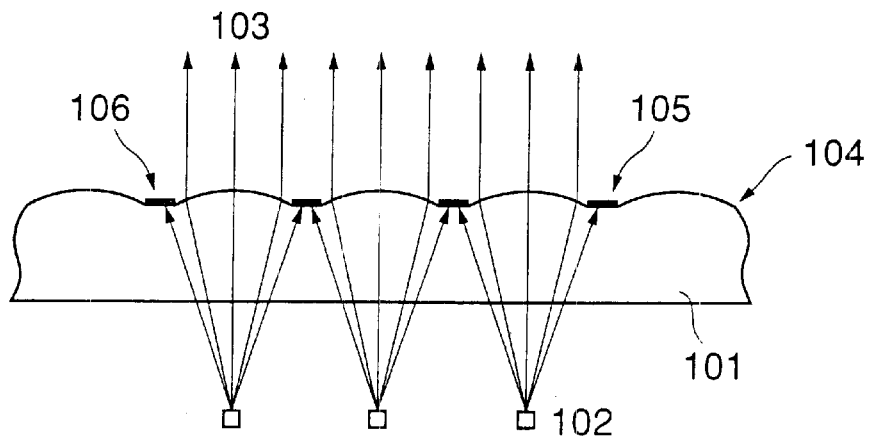
FIG. 14 is a sectional view of a lens plate of a conventional optical device.
Figure 15:
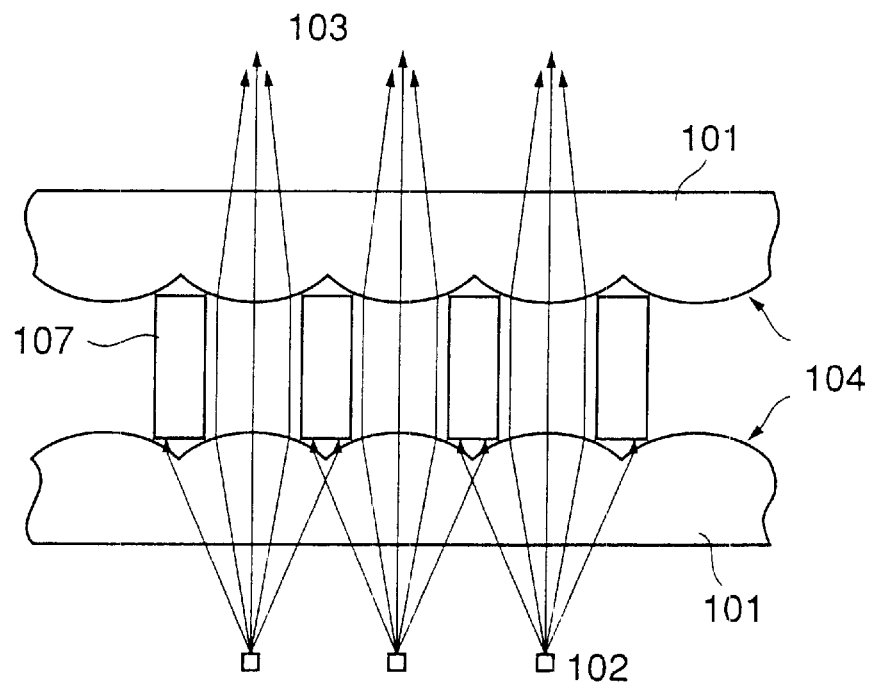
FIG. 15 is a sectional view of another conventional optical device.

However, in the case of a light source of good directionality, the presence of the V grooves shown in FIG. 12 are sufficient, while, in the case of a light source of poor directionality, some light beams may pass between the grooves of the upper and lower lens plates and cause the cross talk. For prevention of this cross talk, it is preferable to increase the width of the grooves. FIG. 13 illustrates an embodiment in which the grooves are widened and light-shielding portions 20 are formed in the grooves.

In FIG. 13, the angles of the inclined faces of grooves 19 are the same as in FIG. 12. But the width a22 of the grooves 19 is increased to 0.2 mm, and bottoms of the grooves 19 are flattened to have a width a23 of 0.05 mm. The light-shielding portions 20 are provided at least in the bottoms of the grooves for blocking off light beams which pass through the bottoms and cause the cross talk.

In the embodiment shown in FIG. 13, even with a light source having a directionality of 20° in the X direction and 20° in the Y direction, the intensity of the cross-talk light to adjacent lenses was decreased to 0.0015% or less of the main peak, which was almost the same as with the optical device shown in FIG. 12.

In the case where the lenses are formed by a replication method such as heat pressing, injection molding or the like, the above-described grooves at the lens joints can be formed simultaneously with the formation of the lenses by pre-forming the configuration of the grooves in a mold. Therefore, the two-dimensional lens arrays can be fabricated at very low costs. This two-dimensional lens array structure is also applicable to hexagonal lenses arranged closely.

According to the present invention, since the grooves are provided at the joints of adjacent lenses in the lens array formed on the lens plate, it is possible to realize an optical device which reduces the cross talk by light incident from adjacent lenses and has good image-formation characteristics.

What is claimed is:

1. An optical device comprising a plurality of lens plates spaced at specific intervals, at least one of which is provided with a lens array on at least one of its front and rear faces, the lens array being composed of a plurality of closely arranged lenses of a specific configuration, wherein the lens array has at least one groove having a V-shaped cross-sectional configuration at a joint of adjacent lenses in at least one part of the lens array.

2. An optical device according to claim 1, wherein the groove is formed to have a surface configuration such that light incident on the groove is refracted or reflected so as not to contribute to image formation.

3. An optical device according to claim 1, wherein the groove has a V-shaped cross-sectional configuration formed of two inclined faces having the same angle of inclination.

4. An optical device according to claim 1, wherein the groove has a V-shaped cross-sectional configuration formed of two inclined faces having different angles of inclination.

5. An optical device according to claim 3 or 4, wherein the groove comprises a plurality of grooves arranged adjacently.

6. An optical device according to claim 1, wherein the lens array is an array of a plurality of cylindrical lenses arranged in one direction.

7. An optical device according to claim 1, wherein the lens array is an array of lenses of a specific configuration arranged two-dimensionally.

8. An optical device according to claim 1, wherein the groove is provided with a light-shielding portion so as not to transmit light in the portion.

9. A display device comprising:

a light source;

a liquid crystal panel disposed adjacently to the light source;

an image-forming screen; and an optical device as set forth in claim 1 interposed between the liquid crystal display panel and the image-forming screen, wherein the display device forms an image displayed on the liquid crystal panel onto the image-forming screen through the optical device.

10. A display device according to claim 9 further having a function of magnifying the image, wherein the image displayed on the liquid crystal panel is magnified and the magnified image is formed onto the image-forming screen through the optical device.

11. An optical device comprising:

four lens plates spaced at specific intervals; and light-shielding members disposed between the lens plates for maintaining spacings between the lens plates, wherein each of the lens plates has, on its front and rear faces, lens arrays of cylindrical lenses closely arranged in directions orthogonal to each other, and is provided with a groove at a joint of adjacent cylindrical lenses.

12. An optical device according to claim 11, wherein the groove is formed to have a surface configuration such that light incident on the groove is refracted or reflected so as not to contribute to image formation.

* * * * *